(12) United States Patent
Aoki et al.

(10) Patent No.: US 6,179,040 B1
(45) Date of Patent: Jan. 30, 2001

(54) TRANSMISSION SHIFT FORK, AND MANUFACTURING METHOD THEREOF

(75) Inventors: Tomohiro Aoki, Atsugi; Masami Kawasaki, Hiratsuka; Kenichi Tsuchiya, Kosai, all of (JP)

(73) Assignees: Nissan Motor Co., Ltd., Yokohama; Fuji Univance Corporation, Shizuoka, both of (JP)

(*) Notice: Under 35 U.S.C. 154(b), the term of this patent shall be extended for 0 days.

(21) Appl. No.: 09/198,453

(22) Filed: Nov. 24, 1998

(30) Foreign Application Priority Data

Dec. 9, 1997 (JP) ..................................... 9-338596

(51) Int. Cl.[7] ............................ B22D 17/08; B22D 27/20; B22D 29/00
(52) U.S. Cl. ........................... 164/113; 164/132; 164/900
(58) Field of Search ..................................... 164/113, 900, 164/132

(56) References Cited

U.S. PATENT DOCUMENTS 4,548,253 * 10/1985 Funatani et al. ..................... 164/80
5,201,237 * 4/1993 Berndtson ......................... 74/473 R

FOREIGN PATENT DOCUMENTS

| 4-4961 | 1/1992 | (JP) . |
| 5-340471 | 12/1993 | (JP) . |
| 6-117451 | 4/1994 | (JP) . |
| 8-49035 | 2/1996 | (JP) . |

* cited by examiner

Primary Examiner—Kuang Y Lin
(74) Attorney, Agent, or Firm—McDermott, Will & Emery

(57) ABSTRACT

A shift fork used in a transmission which engages with an engaging groove of a coupling sleeve of the transmission, comprises a fork main body and an engaging part integrally molded therewith. The engaging part has an engaging surface which comes in contact with a coupling sleeve, and the engaging surface is formed in a bulging shape by high precision aluminum diecasting.

2 Claims, 4 Drawing Sheets

TRANSMISSION SHIFT FORK, AND MANUFACTURING METHOD THEREOF

FIELD OF THE INVENTION

The present invention relates to a shift fork used in a manual transmission.

BACKGROUND OF THE INVENTION

A shift fork used to move a coupling sleeve in an axial direction when a transmission gear shift is performed, is manufactured for example by aluminum diecasting. During manufacture, an engaging part which engages with an engaging groove of the coupling sleeve is formed at the tip of the fork main body.

Conventionally, ADC12 was chiefly used as a diecasting material in aluminum diecasting. Recently, high silicon aluminum diecasting materials with superior wear-resistant properties to those of ADC12 have also come into use. Such materials are used to mold the fork main body and the engaging part in a one-piece construction so as to decrease costs and achieve a lightweight construction.

As shown in FIG. 5, a claw-shaped engaging part 52 is usually molded integrally at the tip of a fork main body 51, and the engaging part 52 slides on a rotating coupling sleeve 54. In order to obtain high wear-resistant properties in the engaging part of high silicon aluminum shift forks, a casting surface is cut by 50 μm or more so as to cause pro-eutectic silicon to form on the surface.

FIG. 6 is a view from the direction of the arrow VI in FIG. 5. Flat engaging surfaces 53L, 53R are formed on the engaging part 52 by the above process.

However, in the prior art shift fork, because there is a space between the engaging part 52 and coupling sleeve 54, when the shift fork bends and the engaging part 52 inclines, the engaging surfaces 53L, 53R and coupling sleeve 54 do not come into contact evenly. For instance, when the shift fork 50 moves to the right of FIG. 6, the rotating coupling sleeve 54 and the upper right corner of the engaging part 52 will come in contact. As a result, the surface pressure increases, the wear of the engaging part 52 increases, and the engaging part 52 wears unevenly as shown by the dotted line in the figure.

As shown in FIG. 5, ideal points $P_{1L}$, $P_{1R}$, at which the coupling sleeve 54 should be pushed, lie on a straight line which passes through the center O of the coupling sleeve 54. However, when the engaging part 52 inclines and comes in contact with the coupling sleeve 54, the positions at which the engaging part 52 pushes the coupling sleeve are points $P_{2L}$, $P_{2R}$ which are offset upwards in the figure above the ideal points $P_{1L}$, $P_{1R}$.

When the contact point of the engaging part 52 and coupling sleeve 54 shifts from the ideal points $P_{1L}$, $P_{1R}$ in this way, a force acts on the coupling sleeve 54 in a direction other than axial and operating performance decreases.

Tokkai Hei 5-340471 issued by the Japanese Patent Office in 1993 and Tokkai Hei 6-117451 issued in 1994 disclose a method regarding wear-resistant properties of the engaging part wherein a wear-resistant member is made to adhere to the engaging part, and deformation of the engaging part is prevented.

Further, Tokkai Hei 8-49035 published by the Japanese Patent Office in 1996 discloses an engaging part integrally molded with the fork main body from an wear-resistant aluminum alloy, and shot peening is performed.

However, in all these cases, additional machining is necessary after diecasting.

SUMMARY OF THE INVENTION

It is therefore an object of this invention to provide a low cost shift fork for a transmission having high wear-resistant properties and high operational performance.

In order to achieve the above object, this invention provides a shift fork engaging with an engaging groove of a coupling sleeve of a transmission, the shift fork comprising a fork main body, and an engaging part having an engaging surface which comes in contact with an inner wall of the engaging groove and integrally molded with the fork main body, wherein the engaging surface is formed in a bulging shape.

According to an aspect of this invention, this invention provides a method for casting a shift fork engaging with an engaging groove of a coupling sleeve of a transmission, the shift fork comprising a fork main body, and an engaging part having an engaging surface which comes in contact with an inner wall of the engaging groove and integrally molded with the fork main body. The method comprises a step for pouring molten metal into a mold with no draft slope comprising a fixed die and a movable die, the mold forming the engaging surface in a bulging shape, and a step for opening the mold and removing the shift fork therefrom while the shift fork therein is in a semi-solid state.

The details as well as other features and advantages of this invention are set fourth in the remainder of the specification and are shown in the accompanying drawings.

DESCRIPTION OF THE PREFERRED EMBODIMENTS

Figure 1:
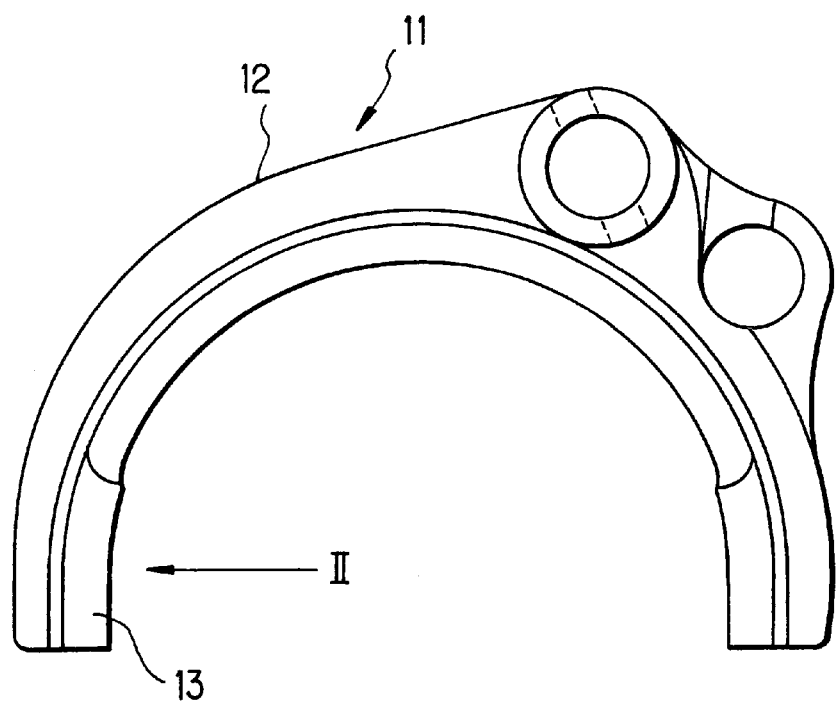
FIG. 1 is a front view of a transmission shift fork according to this invention.

Referring to FIG. 1 of the drawings, a shift fork 11 for a transmission is formed by high precision aluminum diecasting, and an engaging part 13 which engages with the engaging groove of a coupling sleeve is integrally molded at the tip of a fork main body 12.

In the high precision aluminum diecasting mentioned here, molten metal is injected into a mold without a draft slope comprising a fixed die and a movable die, and when the product in the mold has semi-solidified, the mold is opened and the product is removed. As the mold is opened and the product is removed while the product is still semi-solid, it can be removed easily even from a mold without a draft slope. Also, as there is no draft slope, cutting at parts corresponding to the draft slope is unnecessary and the desired dimensional precision can be achieved simply by casting. An example of high precision aluminum diecasting is given in Tokkai Hei 4-4961 published by the Japanese Patent Office in 1992.

In a prior art shift fork where the fork main body and the engaging part were not integrally molded, ADC12 was used as the material of the fork main body and a copper alloy such as C6161P was used as the material of the engaging part. On the other hand, in the shift fork according to this invention where the fork main body and engaging part are integrally molded by high precision aluminum diecasting, both the fork and main body are formed of a high silicon aluminum diecasting material having superior wear-resistant properties to those of ADC12.

Figure 2:
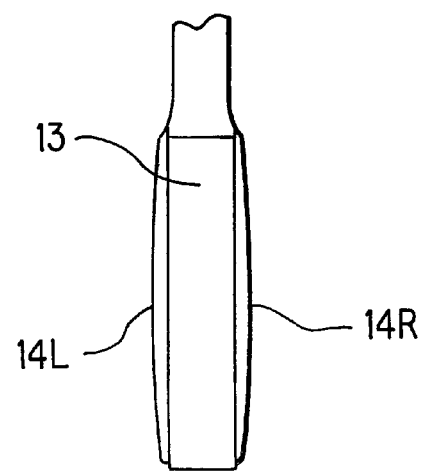
FIG. 2 is a side view of an engaging part of the shift fork viewed from the direction of an an arrow II in FIG. 1.

Referring to FIG. 2 viewed from the direction of the arrow II of FIG. 1, engaging surfaces 14L, 14R which come in contact with a coupling sleeve 15 are formed by casting in a bulging shape. Herein, the aforesaid fixed and movable dies are of suitable forms so that the engaging surfaces 14L, 14R can be molded in a bulging shape.

Figure 3:
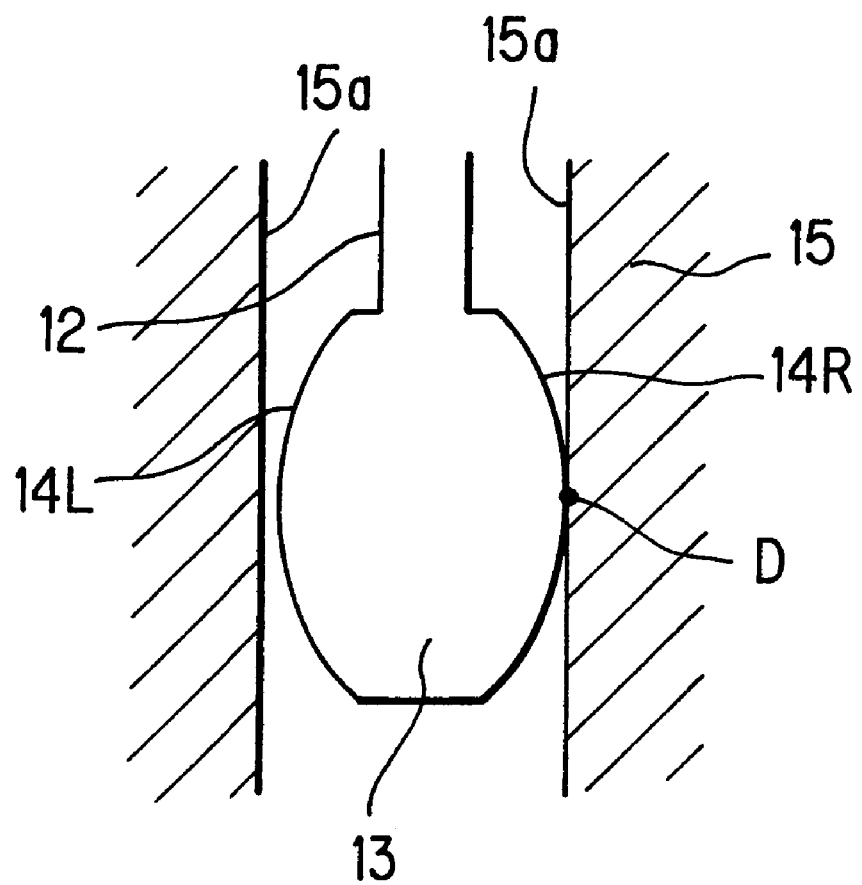
FIG. 3 is a diagram describing an engaging state of the engaging part of the shift fork.
Figure 5:
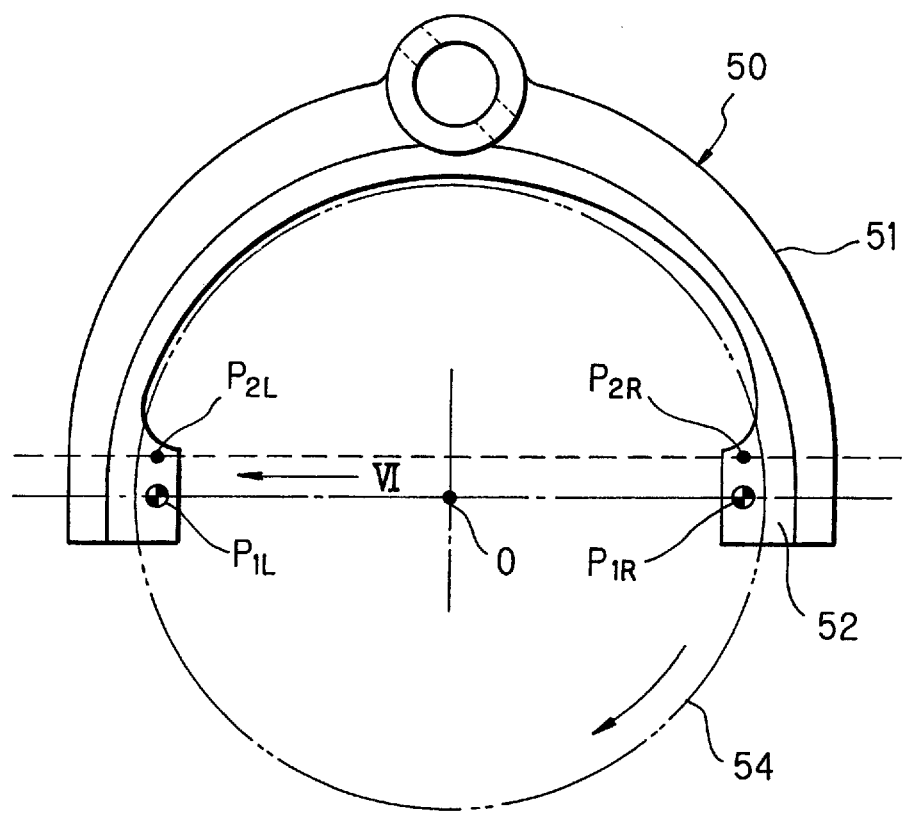
FIG. 5 is a front view of a shift fork of a prior art example.
Figure 6:
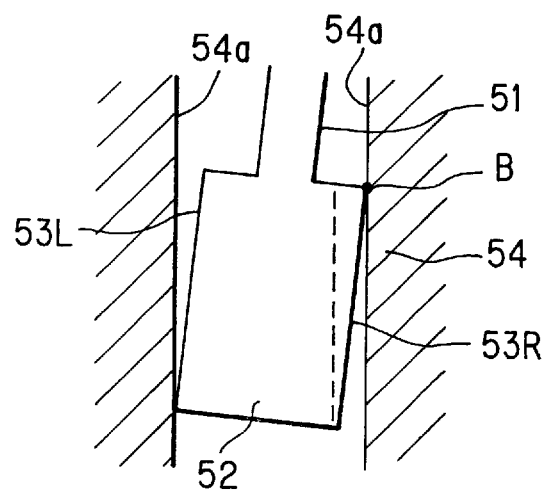
FIG. 6 is similar to FIG. 3, but showing the engaging part of the shift fork of the prior art example.

When the engaging surfaces 14L, 14R are formed in a bulging shape, the engaging part 13 comes in contact with the inner wall 15a of an engaging groove of the coupling sleeve 15 at a point D in the middle of the engaging surfaces 14L, 14R as shown in FIG. 3. This point D coincides with the ideal points $P_{1L}$, $P_{1R}$ for pushing the coupling sleeve shown in FIG. 5. The engaging lart 13 therefore pushes the coupling sleeve 15 at the ideal points, and operating performance improves as no force acts on the coupling sleeve 15 except in an axial direction.

Although the engaging part 13 may incline according to the variation of pushing load, the engaging part 13 and the inner wall 15a still come in contact in the vicinity of the point D, so there is almost no decrease of operating performance. Further, as the contact point shifts, the apparent contact area increases, so wear-resistant properties improve.

As the bulging shape of the engaging surfaces 14L, 14R is molded by high precision aluminum diecasting, and additional machining is not necessary, the cost of manufacturing the engaging surfaces 14L, 14R is the same whether or not the bulging shape is formed.

Figure 4:
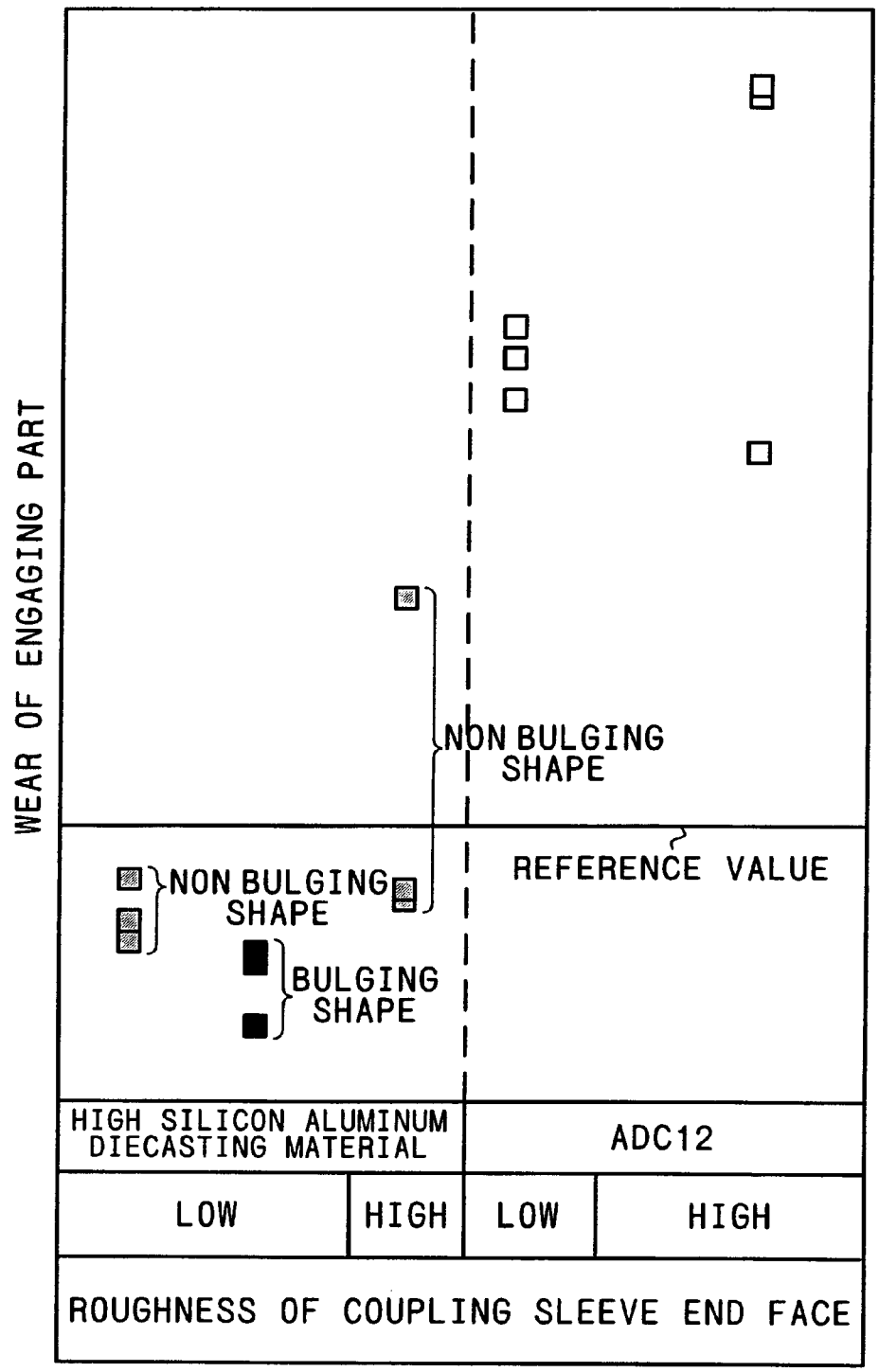
FIG. 4 is a diagram showing the result of a test related to wear-resistant properties of the engaging part.

FIG. 4 shows the result of a test relating to the wear-resistant properties of the engaging part of the shift fork according to this embodiment and a prior art shift fork.

Herein, a shift fork using ADC12, wherein the main body and engaging part are not integrally molded, shows wear far exceeding the reference value, both for a coupling sleeve end face with high roughness and a coupling sleeve end face with low roughness.

In a shift fork using a high silicon aluminum diecasting material wherein the main body and engaging part are integrally molded, when the roughness of the coupling sleeve end face is high and the engaging surface is not formed in a bulging shape, some products show lower wear than the reference value, but most far exceed this value.

In a shift fork using a high silicon aluminum diecasting material wherein the main body and engaging part are integrally molded, when the roughness of the coupling sleeve end face is low and the engaging surface is not formed in a bulging shape, the wear amount is below the reference value, but many products are in the vicinity of the reference value which is the permitted limit of wear.

However, in a shift fork using a high silicon aluminum diecasting material wherein the main body and engaging part are integrally molded, when the roughness of the coupling sleeve end face is low and the engaging surface is formed in a bulging shape, wear is much less than the reference value.

As is clear from this result, the wear resistance is improved by approximately two times when the engaging surfaces are formed in a bulging shape as compared to the case when they are not formed in a bulging shape.

According to this invention, the shift fork is formed by high precision aluminum diecasting, so the engaging surfaces can be formed in a bulging shape simply by casting.

This is in contrast to prior art diecasting where it was necessary to form a draft slope in the mold and the engaging surfaces could not be formed in a bulging shape only by casting. As tools cannot be inserted in the inner circumference of the shift fork in which the engaging part is formed, it was difficult to form a bulging shape by cutting and machining the entire surface area of the engaging part.

A possible solution would be to first form the engaging surface in an approximate bulging shape by casting, and then to make adjustment by machining so as to obtain the desired dimensional precision. However, when additional machining is carried out after casting, if the engaging surface of the engaging part is cut shallow, the chilled layer of the casting surface is removed so wear-resistant properties decline. If the surface is cut deep, pro-eutectic Si is distributed on the surface so the same wear-resistant properties as a casting surface are obtained, but the resulting flat part is too large so a bulging shape cannot be formed. In all of the above cases, machining is required after casting, which increases costs Another possible way of forming the bulging shape is electric discharge machining, but with this method, productivity is low and as the required equipment is expensive, and thus leads to further cost increases. Moreover, a chilled layer or pro-eutectic Si cannot separate on the surface, so wear-resistant properties again decline.

The contents of Japanese Application No. 9-338596, with a filing date Dec. 9, 1997, are hereby incorporated by reference.

The embodiments of this invention in which an exclusive property or privilege is claimed are defined as follows:

1. A method for casting a shift fork engaging with an engaging groove of a coupling sleeve of a transmission, said shift fork comprising a fork main body, and an engaging part having an engaging surface which comes in contact with an inner wall of said engaging groove and integrally molded with said fork main body, comprising:

a step for pouring molten metal into a mold with no draft slope comprising a fixed die and a movable die, said mold forming said engaging surface in a bulging shape, and a step for opening said mold and removing said shift fork therefrom while said shift fork therein is in a semi-solid state.

2. A method for casting a shift fork engaging with an engaging groove of a coupling sleeve of a transmission, said shift fork comprising a fork main body, and only two engaging parts, each respective engaging part having an engaging surface which comes in contact with an inner wall of said engaging groove and integrally molded with said fork main body, comprising:

a step for pouring molten metal into a mold with no draft slope comprising a fixed die and a movable die, said mold forming said engaging surfaces in a bulging shape whereof the middle point lies on a line which passes through the center of the coupling sleeve, and a step for opening said mold and removing said shift fork therefrom while said shift fork therein is in a semi-solid state.

* * * * *